(12) United States Patent
Eltner

(10) Patent No.: US 8,388,455 B2
(45) Date of Patent: Mar. 5, 2013

(54) ANTIFRICTION BUSHING

(75) Inventor: Frank Eltner, Feldkirch (AT)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 49 days.

(21) Appl. No.: 12/976,277

(22) Filed: Dec. 22, 2010

(65) Prior Publication Data

US 2012/0165106 A1  Jun. 28, 2012

(51) Int. Cl.
F16D 3/06 (2006.01)

(52) U.S. Cl. .................. 464/8; 464/16; 464/162

(58) Field of Classification Search .............. 464/8, 9, 464/16, 162, 179, 903; 384/42; 508/181, 508/519, 582
See application file for complete search history.

(56) References Cited

U.S. PATENT DOCUMENTS

| | | | |
|---|---|---|---|
| 2,198,654 A * | 4/1940 | Calkins et al. .................. 464/9 |
| 3,400,558 A * | 9/1968 | Haines .......................... 464/162 |
| 4,667,530 A * | 5/1987 | Mettler et al. ............. 464/162 X |
| 5,383,811 A | 1/1995 | Campbell et al. |
| 5,460,574 A * | 10/1995 | Hobaugh ....................... 464/162 |
| 5,821,204 A | 10/1998 | Kato et al. |
| 6,149,526 A | 11/2000 | Boersma et al. |
| 6,241,616 B1 * | 6/2001 | Lightcap ........................ 464/162 |
| 6,705,946 B2 * | 3/2004 | Bridges ............................. 464/8 |
| 6,733,039 B2 * | 5/2004 | Honda et al. |
| 7,559,266 B2 * | 7/2009 | Kurokawa |

FOREIGN PATENT DOCUMENTS

| | | |
|---|---|---|
| DE | 32 02 669 | 8/1983 |
| DE | 10 2008 049 825 | 10/2008 |
| DE | 10 2008 049825 | 4/2010 |
| EP | 0 916 564 | 10/1998 |
| EP | 1 526 296 | 4/2005 |
| EP | 1 840 399 | 12/2005 |
| EP | 1 840 193 | 3/2007 |
| WO | 2010/037509 | 4/2010 |

OTHER PUBLICATIONS

Todd, Allen and Alting, Manufacturing Processes Reference Guide, 1994, Industrial Press Inc, First Edition, p. 17.*
European Search Report issued Feb. 9, 2011 in European Application No. 10 01 5878.
Ulrich Fischer et al., "Tabellenbuch Metall", Verlag Eurpora Lehrmittel, Haan-Gruiten, 43$^{rd}$ Edition, 2005, pp. 98-99.
W. Beitz et al., "DUBBEL Taschenbuch für den Maschinenbau", Neunzehnte, völlig neubearbeitete Auflage, Mit mehr als 3000 Abbildungen und Tabellen, pp. F28-F31.

* cited by examiner

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

An antifriction bushing is provided for the bearing of a telescopable steering spindle having an inner spindle and an outer spindle which are disposed coaxially with respect to one another and displaceably with respect to one another and for the torque transmission have a cross section differing from circular. Between the outer spindle and the inner spindle, an interspace is provided for receiving the antifriction bushing consisting of a thermoplastic synthetic material or comprising such material. The bushing includes an inner surface and an outer surface, and consists of a mixture comprising the material PEEK and additionally at least one of the materials PTFE at a volume fraction of up to maximally 15% and/or graphite at a volume fraction of up to maximally 15% and/or carbon fibers at a volume fraction of up to maximally 40%.

9 Claims, 5 Drawing Sheets

ANTIFRICTION BUSHING

BACKGROUND OF THE INVENTION a) Field of the Invention

The present invention relates to an antifriction bushing for the bearing of a telescopable steering spindle with an inner spindle and an outer spindle which are disposed coaxially and displaceably with respect to one another and, for torque transmission, have a cross section differing from circular. Between the outer spindle and the inner spindle an interspace is provided for receiving the antifriction bushing consisting of a thermoplastic synthetic material or comprising such, and the bushing has an inner surface and an outer surface. The invention furthermore relates to a telescopable steering spindle with an inner spindle and an outer spindle, which are coaxial with respect to one another and (for the torque transmission) have a cross section differing from circular. Between the outer spindle and the inner spindle an interspace is provided in which such an antifriction bushing is disposed.

b) Description of Related Prior Art

Antifriction bushings are employed for friction reduction and/or the clearance or play compensation for example between jacket tubes rotatable with respect to one another and telescopable or between an outer and an inner shaft of a telescopable steering spindle.

Telescopable steering spindles have two coaxial shaft parts having a nonround cross section and which are axially displaceable, and the spindles can transmit a torque. Essential in steering spindles is the freedom from play in the torque transmission, while also having as low a friction level as possible. Telescopable steering spindles are employed in motor vehicles between the steering gear and the generally adjustable steering column. They are intended to compensate for minor changes in the distance between the steering gear and the steering column, such as develop for example due to dynamic loading in a driving operation through distortion of the vehicle body or through movements of the steering gear in a rubber bearing and/or are made possible through a length adjustment of the steering spindle.

The generic prior art is demonstrated in EP 916564 B1. Here, a telescopable steering spindle with nonround profile of the cooperating shaft parts is described. Between the two shaft parts is provided a synthetic bushing with the task of improving the service life of the antifriction properties. In particular, the tendency toward a so-called stick-slip effect is to be decreased. During small movements, this effect causes a force peak in the axial direction due to the difference between static friction and kinetic friction, which peak leads to unacceptable noise development in motor vehicle steering mechanisms.

In telescopable steering spindles according to the prior art, this is not achieved to lasting satisfaction.

As an improvement, DE 102008049825 A1 proposes a selective roughening of the antifriction bushing.

EP 1840193 A2 discloses a sliding connection in which a lubricant with a kinematic viscosity in the range of 1500 to 13,000 mm$^2$/s at 40° C. is employed. Further disclosed is that the contact faces can be coated with a synthetic resin layer.

EP 1840399 A1 also discloses a sliding connection in which a lubricant with a dynamic viscosity in the range of 10 to 210 mm$^2$/s at 25° C. is employed, and the lubricant contains a pressure additive. Onto the contact faces is applied a surface layer, for example of a polytetrafluoroethylene (PTFE).

The improvements proposed in these publications, however, are cost-intensive and complex and to some extent require additional work steps and do not always contribute to a long service life.

SUMMARY OF THE INVENTION

The present invention therefore addresses the problem of providing an antifriction bushing or a telescopable steering spindle with permanently improved antifriction properties, wherein the expenditure for the production of the parts is decreased.

An antifriction bushing according to the invention is provided for the bearing of a telescopable steering spindle with an inner spindle and an outer spindle, which are disposed coaxially and displaceably with respect to one another. For the torque transmission, the inner and outer spindles have a cross section differing from circular. Between the outer spindle and the inner spindle an interspace is provided for receiving the antifriction bushing consisting of a thermoplastic synthetic material or comprising such material. The bushing has an inner surface and an outer surface, and is comprised of a mixture of the material PEEK and, additionally, at least one of the materials PTFE at a volume fraction of up to maximally 15% and/or graphite at a volume fraction of up to maximally 15% and/or carbon fibers at a volume fraction of up to maximally 40%.

The use of an antifriction bushing according to the invention has the advantage that a sliding connection is produced between the structural elements, and the connection has a long service life and sustainably reduces the stick-slip effect.

By PEEK is understood the synthetic material polyether ether ketone or a derivative from the group of polyaryl ether ketones. However, polyether ether ketone is to be preferably used as the PEEK. As already stated above, by PTFE is to be understood polytetrafluoroethylene. The term coal-substance [DE] or carbon fiber is also known by the names carbon fiber [UK] or coal [DE] fiber. Admixing at least one of the materials PTFE, graphite and/or carbon fibers leads to the lowering of the static friction while maintaining the service life. The unexpected effect to the person of skill in the art lays in that the difference between static and kinetic friction can also be decreased.

The antifriction bushing is preferably formed of a mixture of the material PEEK and additionally the material PTFE at a volume percentage in the range of 7% to 13% and additionally the material graphite at a volume fraction of 7% to 13% and additionally carbon fibers at a volume fraction of 25% to 35%, and further materials can also be comprised in the mixture. The combination of the materials increases the service life of the antifriction bushing and the sliding connection formed therewith. It has been found to be especially advantageous to realize the antifriction bushing of a mixture which comprises the material PEEk as well as PTFE at a volume fraction of 10% and graphite at a volume fraction of 10% and carbon fibers at a volume fraction of 30% or consists entirely of these materials. Such synthetic materials are basically known and commercially available.

A telescopable steering spindle according to the invention comprises an inner spindle and an outer spindle disposed coaxially with respect to one another and (for the torque transmission) having a cross section differing from circular and between which an interspace is provided. An antifriction bushing is disposed in the interspace between the outer spindle and the inner spindle, and has a sliding contact with the outer and/or inner spindle. The antifriction bushing consists of a mixture comprising the material PEEK and additionally at least one of the materials PTFE at up to maximally a 15% volume fraction and/or graphite at up to maximally a 15% volume fraction and/or carbon fibers at up to maximally a 40% volume fraction.

In a further development of the invention, into the sliding mating between the antifriction bushing and the inner and/or outer spindle is introduced a lubricant. A suitable lubricant has been found to be a lubricant with a dynamic viscosity in the range of 2000 mPa·sec to 4000 mPa·sec at a temperature of 25° C., and in the range of 600 mPa·sec to 1200 mPa·sec at a temperature of 80° C., and in the range of 150,000 mPa·sec to 220,000 mPa·sec at a temperature of −20° C. in the sliding contact between the antifriction bushing and the outer spindle. The dynamic viscosity is conceptually equivalent to the term shear viscosity.

Especially advantageous has been found the use of a lubricant with a dynamic viscosity in the range of 2500 mPa·sec to 3500 mPa·sec at a temperature of 25° C., and in the range of 800 mPa·sec to 1000 mPa·sec at a temperature of 80° C., and in the range of 190,000 mPa·sec to 200,000 mPa·sec at a temperature of −20° C.

It was entirely unexpected to find that a lubricant with such a low dynamic viscosity is suitable to contribute to minimization of the step difference between static and kinetic friction.

As a lubricant can advantageously be employed a base oil of a synthetic hydrocarbon mixed with a thickener (soap) of a calcium complex soap. To such a lubricant can also be added a solid lubricant, for example, PTFE. As a lubricant can also be employed, for example, a base oil of perfluoropolyether with the thickener PTFE. Such lubricants are basically known and commercially available.

To improve the adhesion of the lubricant in the region of the sliding contact, the sliding partner of steel with a surface roughness of Ra (=arithmetic mean roughness value) in the range of 0.2 μm to 0.6 μm is suitable. Accordingly, the outer spindle and/or the inner spindle is produced of the material steel. On its surface facing the bushing, roughness values Ra in the range of 0.2 μm to 0.6 μm, preferably in the vicinity of 0.4 μm, are realized.

The Ra values should be assessed according to the DIN EN ISO 4288 (1998-04) or the "Tabellenbuch Metall", VERLAG EUROPA LEHRMITTEL, Haan-Gruiten, 43$^{rd}$ Edition 2005, page 99. The numerical Ra values are to be interpreted as roughness in the sense of the arithmetic mean roughness value with a corresponding roughness depth in micrometers. For example Ra=0.4 is equivalent to Ra=0.4 μm.

To improve the sliding connection, the antifriction bushing is secured on the inner spindle or on the outer spindle against a displacement in the axial direction.

Further details of the invention will be described in connection with an embodiment of the present invention in conjunction with the drawings.

DETAILED DESCRIPTION OF THE PREFERRED EMBODIMENTS

Figure 1:
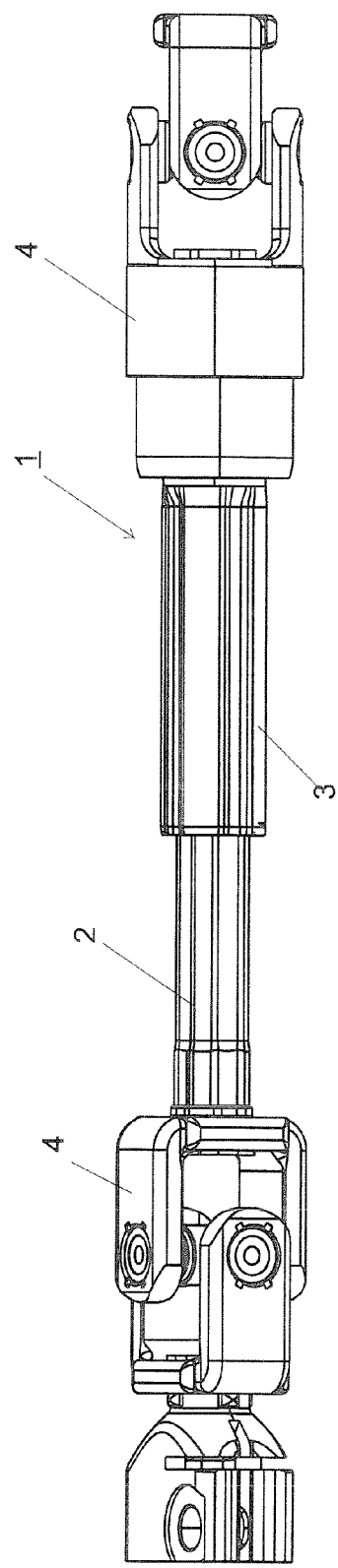
FIG. 1 shows a telescopable steering spindle in a side view.

In FIG. 1 is shown a telescopable steering spindle 1 in a side view. The steering spindle 1 comprises an inner spindle 2 and an outer spindle 3. The inner spindle 2 is provided with a cross section differing from the circular form (=nonround), in this example approximately in the form of a clover leaf. The outer spindle 3 is tubular, with an inner free cross section complementary to the outer circumferential contour of the inner steering spindle. The inner spindle 2 and the outer spindle 3 bear at their end sides connection pieces 4 known per se AS Cardan or universal joints to connect to a steering gear and a steering column. The joint in the example is depicted as a universal joint in which in the connection pieces 4, realized as yokes, the pins of a spider or cross-piece (=cross pin) are rotatably supported, wherein the bearings of the yokes are orthogonally offset with respect to one another. However, it is conceivable and feasible to connect other joints or also entirely different elements to the telescopable shaft parts, for example on one end directly a pinion for the engagement into a steering gear.

Figure 2:
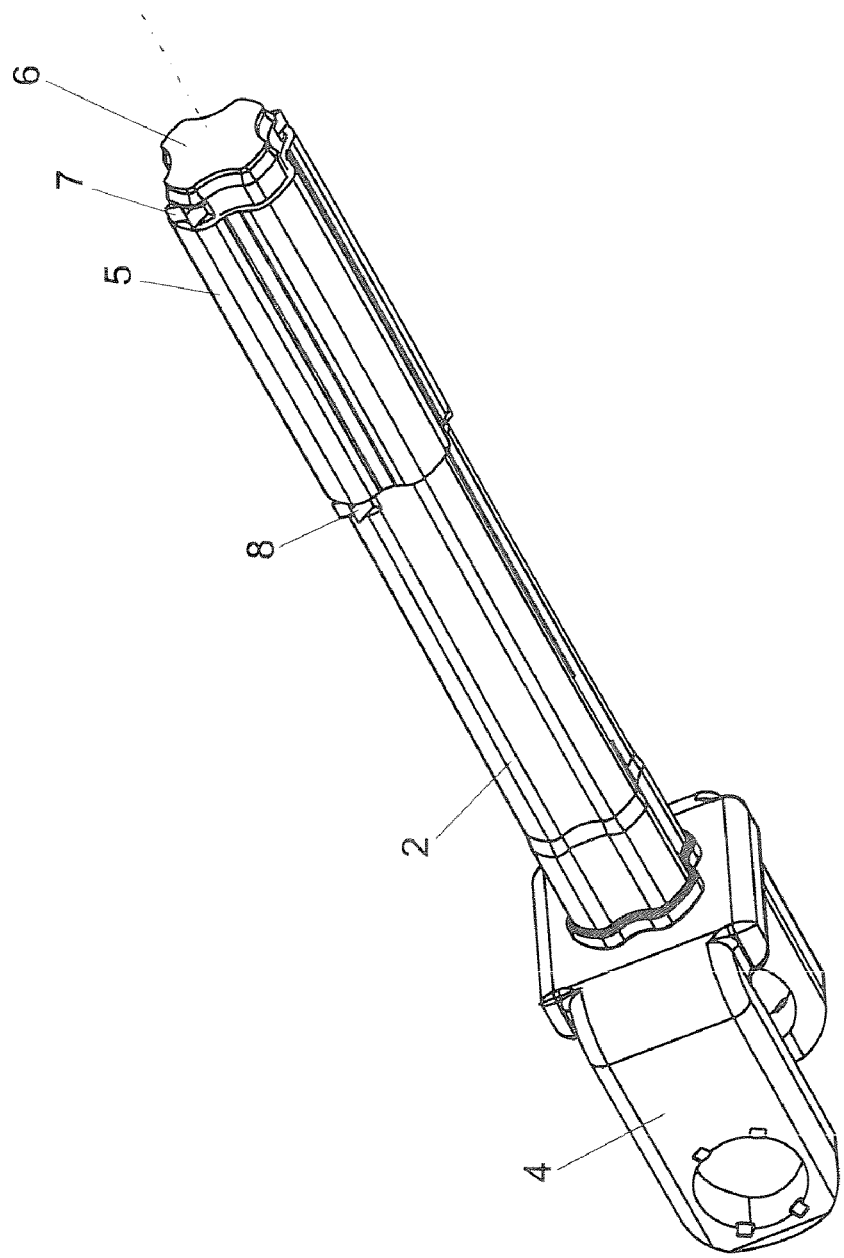
FIG. 2 shows the inner steering spindle with emplaced antifriction bushing in a perspective depiction.

FIG. 2 shows the inner steering spindle 2 in a perspective depiction. The steering spindle 2 here bears an antifriction bushing 5, which is placed in the proximity of a free end 6 of the inner spindle 2 onto the outer contour of the spindle 2 and secured in the axial direction by detents 7, 8.

Figure 3:
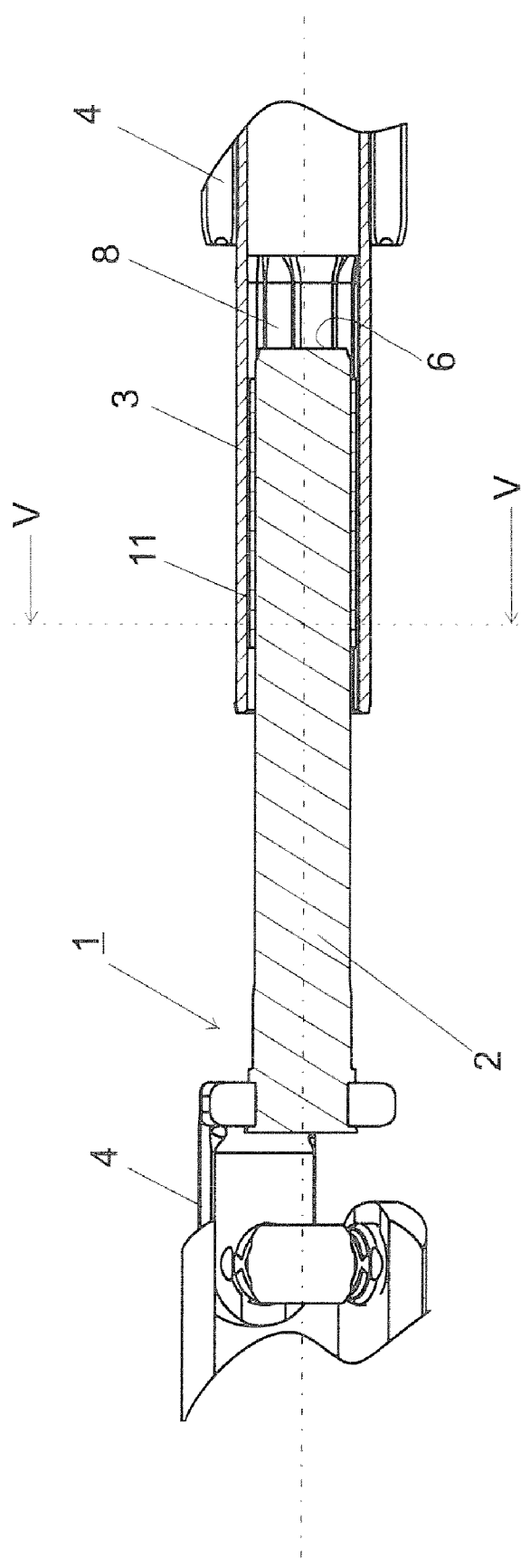
FIG. 3 shows the steering spindle according to FIG. 1 in a longitudinal section from the side.

FIG. 3 shows the steering spindle 1 of FIG. 1 in a longitudinal section. The inner spindle 2 is fabricated of a solid material. Over approximately ¾ of the length of an inner free space 8, the inner spindle 2 it engages into the inner contour of the outer spindle 3. Approximately centrally in the overlap region between the inner spindle 2 and the outer spindle 3 is located the antifriction bushing 5. The free end 6 of the inner steering spindle 2 is located at a distance from the end of the free space 8.

Figure 4:
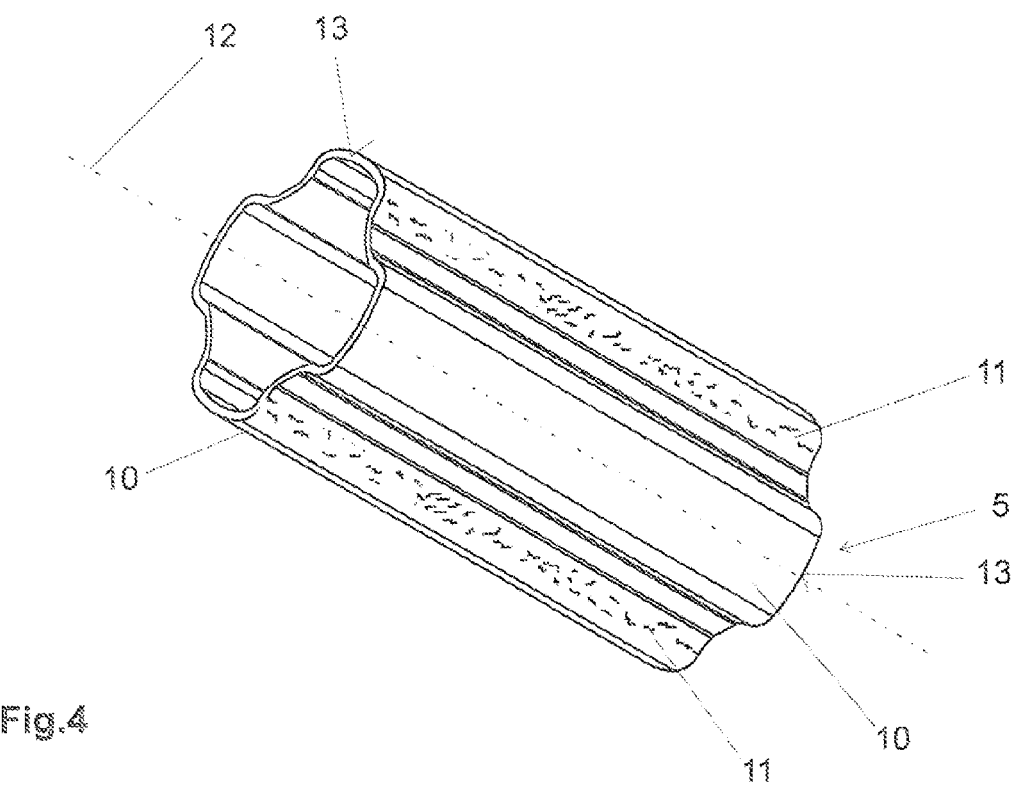
FIG. 4 shows an antifriction bushing according to the invention in a perspective depiction.

FIG. 4 shows the antifriction bushing 5 in a perspective view. The antifriction bushing 5 has a cross section which corresponds approximately to the contour, in the embodiment example this is a contour in the shape of a clover leaf, of the inner spindle 2 and the outer spindle 3.

The antifriction bushing 5 is realized as a structural part with uniform cross section and two parallel end faces 13 oriented perpendicularly to the center axis 12. The antifriction bushing 5 has at its outer side a surface 10. At least on a portion of the surface 10 a lubricant 11 is applied. It is preferred for the entire portion of the surface 10 (which, in the installed state, is in contact with the surface, facing the antifriction bushing (=inner surface), of the outer spindle 3) to be coated with the lubricant. Through the surface roughnesses in the antifriction bushing 5, the lubricant 11 is retained in the contact region, even after the insertion of the inner spindle 2 with the bushing 5 disposed thereon into the hollow space of the outer spindle 3.

Figure 5:
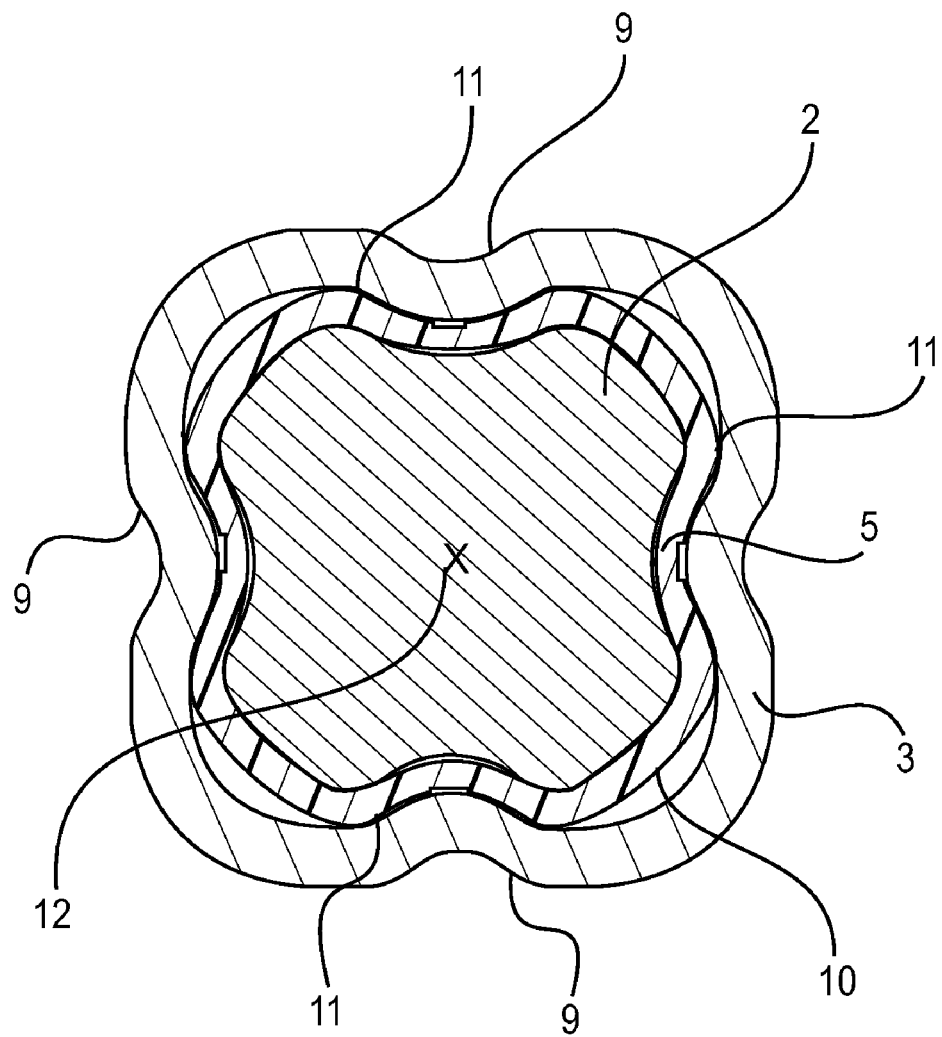
FIG. 5 shows a steering spindle in a cross section through the outer steering spindle, the antifriction bushing and the inner steering spindle.

FIG. 5 shows a cross section through the steering spindle of FIG. 1 and FIG. 3 along a line V-V of FIG. 3. The outer spindle 3 is disposed coaxially with the inner spindle 2 and the antifriction bushing 5. The outer spindle 3 has in particular profile regions 9 a form complementary to the inner spindle 2. In the mounted state, the regions which during operation transmit a torque are in contact with the regions, provided with lubricant 11, of the antifriction bushing 5. In the remaining regions, there is preferably no or only an insignificant contact between the outer spindle 3 and the antifriction bushing 5. Here, the application of lubricant on the antifriction bushing 5 is feasible, but not necessary.

During future operation, it is feasible to connect torsion-tight the steering spindle 1 with the connection pieces 4 via the universal joints, on the one side, with a steering column, on the other side, with the input shaft of a steering gear. Movements of the vehicle body subsequently lead to the axial movement of the universal joints toward or away from one another such that a telescoping movement of the inner spindle with respect to the outer spindle 3 becomes necessary. The antifriction bushing 5 is at least substantially secured non-movably with respect to the inner spindle 2. It thus also executes a telescoping movement with respect to the outer spindle 3. The regions provided with lubricant 11 are herein brought into contact on the inner surface of the outer spindle 3. The so-called stick-slip effect in that case always occurs at the start of the displacement. Here, a change from static friction to kinetic friction takes place, which leads to the undesired stick-slip effect. The stick-slip effect can be decreased through the selection according to the invention of the material of the antifriction bushing 5. Further improvement is attained through the application of the lubricant according to the invention onto the contact faces moved with respect to one another between antifriction bushing 5 and the inner surface of the outer spindle 3. The selection of a steel material for the spindle decreases the stick-slip effect further. In particular, the inner surface, at least in the region of contact, has a roughness of Ra in the range of 0.2 μm to 0.6 μm, especially preferred of 0.4 μm.

The invention also comprises the converse case, in which onto the antifriction bushing lubricant is applied on regions which are located on its inner face. The antifriction bushing is accordingly inserted into the outer spindle 3 and subsequently provided with lubricant. In this case, the antifriction bushing is advantageously axially secured against a displacement with respect to the outer spindle, while the axial displacement between antifriction bushing 5 and inner spindle 2 is permitted.

It is not required for the invention for the bushing to be secured with respect to one of the two shafts in the displacement direction (=telescoping direction), even if such is to be preferred.

With the invention it is moreover feasible to produce a very long service life of the sliding connection with a very high number of relative displacements. In particular, the axial force component of the force difference in the transition between static friction and kinetic friction is less than 10 N within the displacement time of 0.01 seconds.

LEGEND TO THE REFERENCE NUMBERS

1 Steering spindle
2 Inner spindle
3 Outer spindle
4 Connection piece for universal joint
5 Antifriction bushing
6 Free end
7 Detent
8 Detent
9 Profile region
10 Surface region
11 Lubricant
12 Center axis
13 End faces

The invention claimed is:

1. A telescopable steering spindle comprising:
an inner spindle and an outer spindle disposed coaxially with respect to one another and having a cross section different from circular for torque transmission, and an interspace being provided between the inner spindle and the outer spindle;
an antifriction bushing located in the interspace between the outer spindle and the inner spindle and having a sliding contact with at least one of the outer and the inner spindle, wherein the antifriction bushing consists of a mixture comprising the material PEEK and a PTFE material at a volume fraction in a range of 7% to 13%, a graphite material at a volume fraction in a range of 7% to 13%, and carbon fibers at a volume fraction in a range of 25% to 35%; and
a lubricant having a dynamic viscosity in a range of 2000 mPa·sec to 4000 mPa·sec at a temperature of 25° C., in a range of 600 mPa·sec to 1200 mPa·sec at a temperature of 80° C., and in a range of 150,000 mPa·sec to 220,000 mPa·sec at a temperature of −20° C., the lubricant being disposed in sliding contact between the antifriction bushing and at least one of the outer spindle and the inner spindle.

2. The telescopable steering spindle as claimed in claim 1, wherein the antifriction bushing is produced using injection molding or extrusion.

3. The telescopable steering spindle as claimed in claim 1, wherein the lubricant has a dynamic viscosity in a range of 2500 mPa·sec to 3500 mPa·sec at a temperature of 25° C., in a range of 800 mPa·sec to 1000 mPa·sec at a temperature of 80° C., and in a range of 190,000 mPa·sec to 200,000 mPa·sec at a temperature of −20° C.

4. The telescopable steering spindle as claimed in claim 1, wherein the outer spindle is comprised of a steel material, and the outer spindle has a surface facing the bushing, and the surface has roughness values Ra in a range of 0.2 μm to 0.6 μm.

5. The telescopable steering spindle as claimed in claim 4, wherein the surface of the outer spindle facing the bushing has roughness values Ra of approximately 0.4 μm.

6. The telescopable steering spindle as claimed in claim 1, wherein the inner spindle is comprised of a steel material, and the inner spindle has a surface facing the bushing, the surface having roughness values Ra in a range of 0.2 μm to 0.6 μm.

7. The telescopable steering spindle as claimed in claim 6, wherein the surface of the inner spindle facing the bushing has roughness values Ra of approximately 0.4 μm.

8. The telescopable steering spindle as claimed in claim 1, wherein the antifriction bushing is secured on the inner spindle against a displacement in the axial direction.

9. The telescopable steering spindle as claimed in claim 1, wherein the antifriction bushing is secured on the outer spindle against a displacement in the axial direction.

* * * * *